US008352200B2

(12) United States Patent
Contini et al.

(10) Patent No.: US 8,352,200 B2
(45) Date of Patent: Jan. 8, 2013

(54) MONITORING A FILTER USED FOR FILTERING A FLUID IN AN AIRCRAFT ENGINE

(75) Inventors: Pascal Christophe Contini, Isle (FR); Xavier Flandrois, Cesson (FR); Maxime Forte, Limoges (FR); David Hadida, Bonneuil sur Marne (FR)

(73) Assignee: Snecma, Paris (FR)

( * ) Notice: Subject to any disclaimer, the term of this patent is extended or adjusted under 35 U.S.C. 154(b) by 234 days.

(21) Appl. No.: 12/872,358

(22) Filed: Aug. 31, 2010

(65) Prior Publication Data

US 2011/0054811 A1    Mar. 3, 2011

(30) Foreign Application Priority Data

Aug. 31, 2009  (FR) ...................... 09 55920

(51) Int. Cl.
*G01F 23/00*   (2006.01)
*G01L 7/00*    (2006.01)
*G01L 9/00*    (2006.01)
*G01L 11/00*   (2006.01)
*G01L 13/00*   (2006.01)
*G01N 11/00*   (2006.01)
*B01D 35/00*   (2006.01)

(52) U.S. Cl. ............. 702/50; 702/138; 210/90; 210/741
(58) Field of Classification Search ................... 702/50, 702/138; 210/90, 741
See application file for complete search history.

(56) References Cited

U.S. PATENT DOCUMENTS

| | | |
|---|---|---|
| 5,036,698 A | 8/1991 | Conti |
| 2002/0060191 A1 | 5/2002 | Sutton et al. |
| 2004/0188331 A1 | 9/2004 | Moscaritolo |
| 2006/0259273 A1 | 11/2006 | Goldberg |

*Primary Examiner* — Janet Suglo
(74) *Attorney, Agent, or Firm* — Oblon, Spivak, McClelland, Maier & Neustadt, L.L.P.

(57) ABSTRACT

A system for monitoring a filter used for filtering a fluid in an aircraft engine. The system includes a pressure sensor acquiring over time a differential pressure of the fluid through the filter; a computer for computing a normalized differential pressure under reference conditions by normalizing the measured differential pressure according to conditions for exploiting the fluid; a memory for storing a predetermined reference clogging curve describing a time-dependent change of the normalized differential pressure depending on a pollutant mass injected into the filter. The computer can estimate the pollutant mass injected into the filter by projecting a current value of the normalized differential pressure onto the reference clogging curve; and can generate from the estimated pollutant mass a set of signatures defining the condition and the time-dependent change of clogging of the filter.

9 Claims, 3 Drawing Sheets

MONITORING A FILTER USED FOR FILTERING A FLUID IN AN AIRCRAFT ENGINE

FIELD OF THE INVENTION

The present invention relates to the field of monitoring a filter used for filtering a fluid in an aircraft engine. In particular, the invention relates to monitoring a filter installed in an oil circuit or a fuel circuit of the aircraft engine.

A filter installed in a fluid circuit captures the particles present in this fluid by means of a porous material of the filtering medium. This capture causes modification of the porosity of the filtering medium which is expressed under constant operating conditions, by an increase in the differential pressure through the filter as a function of time.

This phenomenon, called clogging, increases the resistance of the filter to the passing of the fluid. This may take more or less time-depending on the exposure of the filter to pollution. When the differential pressure reaches the limiting value for which the filter and the circuit have been designed, the filtering element of the filter should be replaced.

FIG. 7 illustrates an example of a clogging curve expressing the increase in the pressure loss ΔP (in bars) versus time (in hours) and at a constant flow rate.

According to regulations in effect, a main filter for an oil circuit or a fuel circuit has to have a means for indicating its clogging level with which it may be shown that it is less than a predefined threshold.

Thus, FIG. 7 shows that a first threshold S1 for detecting pre-clogging is indicated to the pilot when the pressure loss reaches a level S1 called an "impending by-pass". Beyond this threshold S1, the fluid is diverted from the filter through a back-up by-pass in order to avoid clogging of the filter, considered to have been reached at the threshold S2.

Presently, compliance with these requirements may be ensured by two types of monitoring systems. The first system includes a switch mechanically programmed for changing state from a certain pressure difference between the upstream portion and the downstream portion of the filter. This change in state, corresponding to the impending by-pass threshold S1, then triggers the alarm. This first system is rather simple and inexpensive but does not allow information to be obtained on the clogging level of the filter between its initial condition and the by-pass condition.

The second system includes a differential pressure sensor of the strain-gauge type with which the pressure drop of the filter may be measured over time. When the latter exceeds a certain limit, the system is programmed so as to send an alarm. With this system, it is thereby possible to provide continuous information on the clogging state of the filter.

However, these systems are only used today for preventing a pre-clogging condition, and they do not allow a forecast on the remaining life-time of the filter under actual operating conditions.

OBJECT AND SUMMARY OF THE INVENTION

The present invention relates to a system for monitoring a filter used for filtering a fluid in an aircraft engine, including:
pressure measurement means for acquiring over time a differential pressure of the fluid through the filter;
computation means for computing a normalized differential pressure under reference conditions by normalizing the differential pressure measured as a function of the exploitation conditions of the fluid;
storage means for storing in memory a predetermined reference clogging curve describing a time-dependent change in the normalized differential pressure as a function of a pollutant mass injected into the filter;
computing means for estimating the pollutant mass injected into the filter by projecting a current value of said normalized differential pressure on said reference clogging curve; and
computing means for generating from said estimated pollutant mass a set of signatures defining the condition and the time-dependent change of the clogging of the filter.

Thus, the estimated pollutant mass contained in the filter is a key indicator of the clogging of the filter, with which signatures may be generated which will be used for defining the different aspects of clogging depending on the actual operating conditions. With these signatures, it is possible to diagnose the condition of the filter and to predict its time-dependent operating change with great accuracy and proper anticipation. Further, the signatures may inform on the actual condition of the circuit of the fluid, and optionally of the aircraft engine. Indeed, the signatures generated from the estimated concentration of the pollutant give the possibility of detecting operating abnormalities, internal degradations or external pollution in the circuit of the fluid and of consolidating a diagnosis on another area of the aircraft engine. With the system according to the invention, it should be possible to reduce the times relating to maintenance actions by better anticipation, detection and localization of the faults. In particular, it provides assistance for planning maintenance operations by estimating future faults.

According to an aspect of the present invention, the system includes:
temperature measurement means for acquiring over time a temperature of the fluid through the filter;
computing means for computing a current viscosity value of the fluid depending on its temperature;
computing means for computing a current flow rate value of the fluid depending on engine speed; and
in that the conditions for exploiting the fluid, used for normalizing the differential pressure, include said current viscosity value and said current flow rate value.

Thus, the normalized differential pressure may be considered as a measurement acquired under strictly identical conditions so that the monitoring of the filter may operate identically regardless of the conditions for exploiting the fluid.

According to a first aspect of the invention, the set of signatures includes a time signature indicating an evaluation of the remaining operating time of said filter before reaching a predetermined pre-clogging threshold. This time signature is generated by referring to the reference clogging curve. For this, the computing means estimate the required mass from the current point, represented by a current mass, in order to obtain the pre-clogging threshold. By then considering the low concentration of pollutant, the computing means transpose this remaining mass before pre-clogging into an operating time. This therefore provides a simple forecast with increasing accuracy of the remaining life-time of the filter before reaching the pre-clogging threshold.

According to a second aspect of the invention, the set of signatures includes a local clogging anticipation signature indicating the probability of reaching the pre-clogging threshold on a given horizon. This signature is generated by the computing means from a trend analysis based on a simplified local model of the time-dependent change in the differential pressure over time. This local clogging anticipation signature indicates a determined number of flights before reaching the pre-clogging threshold.

According to a third aspect of the invention, the set of signatures includes a phase signature indicating whether the filter is in a depth clogging phase or in a surface clogging phase. This phase signature gives a rapid clue on the condition in which the filter is found. Indeed, a filter actually approaches its end of life when it is in the surface clogging phase.

According to a fourth aspect of the invention, the set of signatures includes an abnormality signature informing on the detection of abnormal operation of the filter or of the circuit in which the filter is installed. Thus, with the abnormality signature for example, in the case of excessive pollution it is possible to spot poor use of the filter or an abnormality in the circuit of the fluid or in other components of the aircraft engine.

The system includes alerting means for sending an alarm in the case of detecting the end of life of the filter. This alarm may, for example, be sent in order to indicate pre-clogging 20 flights in advance in order to plan the maintenance operation.

The invention also aims at a method for monitoring a filter used for filtering a fluid in an aircraft engine, including the following steps:

measuring over time a differential pressure of the fluid through the filter;

computing a differential pressure under reference conditions by normalizing the measured differential pressure according to the conditions for exploiting the fluid;

storing a predetermined reference clogging curve describing a time-dependent change in the reference differential pressure according to a pollutant mass injected into the filter;

determining the actual pollutant mass contained in the filter by projecting a current value of said normalized differential pressure onto said reference clogging curve; and generating from said actual pollutant mass a set of signatures defining the condition and the time-dependent change in the clogging of the filter.

The invention also aims at a computer program including instructions for applying the monitoring method according to the above features when it is executed by computing means.

SHORT DESCRIPTION OF THE DRAWINGS

Other particularities and advantages of the system according to the invention will become better apparent upon reading the description made hereafter, as an indication but not as a limitation, with reference to the appended drawings wherein.

Figure 5:
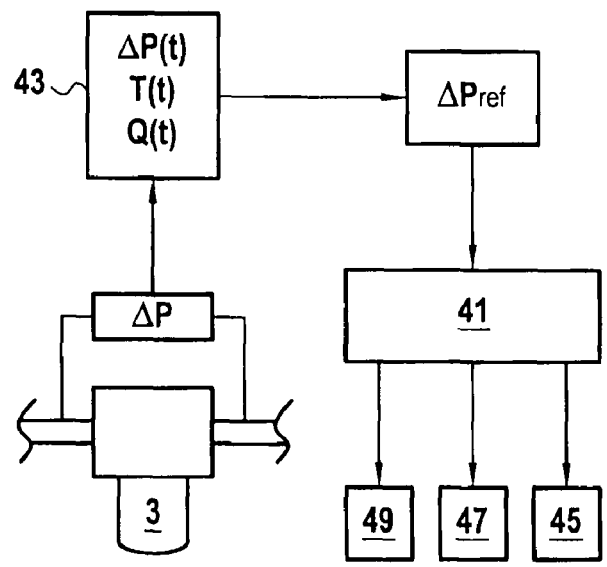
Figure 6:
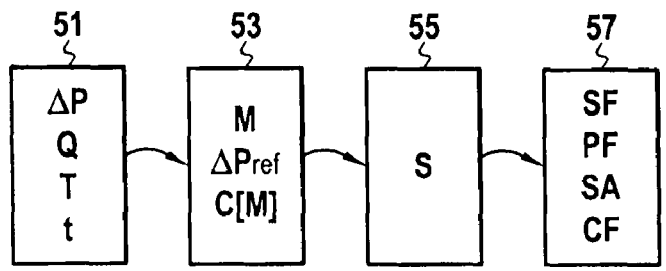
Figure 7:
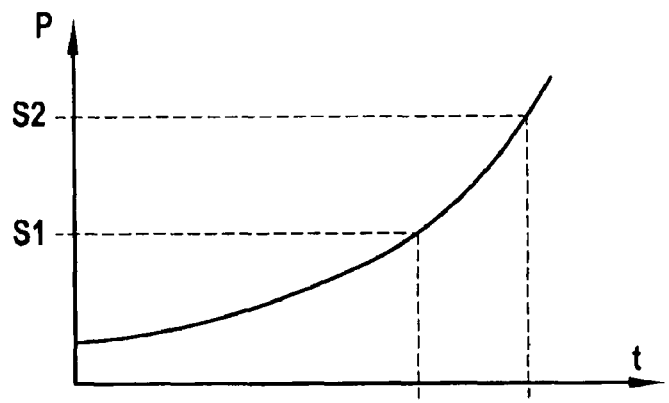

FIG. 5 schematically illustrates the method for monitoring the filter according to the invention;

FIG. 6 illustrates a generic scheme of an algorithm for monitoring a filter in an oil or fuel circuit according to the invention; and FIG. 7 illustrates an example of a clogging curve expressing the increase in the pressure loss versus time.

DETAILED DESCRIPTION OF EMBODIMENTS

Figure 1:
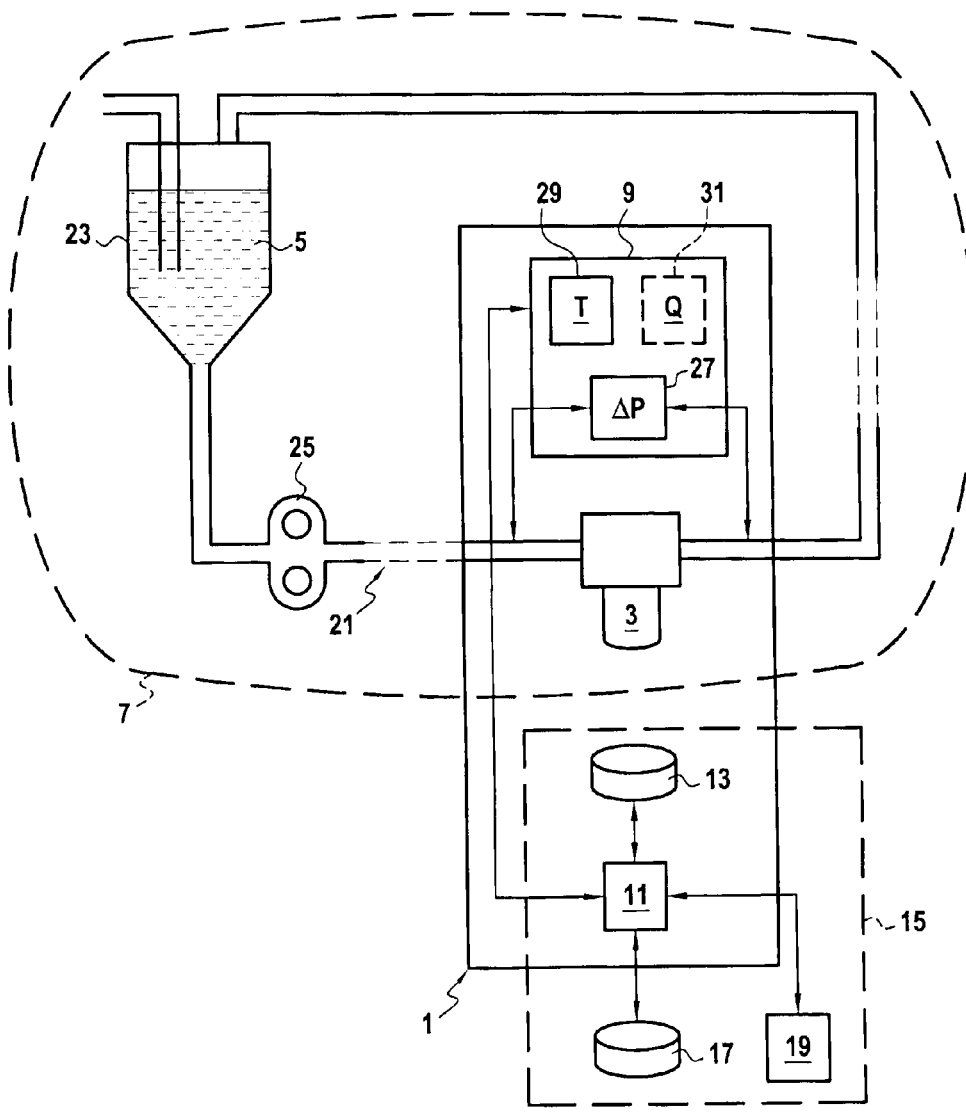
FIG. 1 illustrates hardware means applied in the system for monitoring a filter used for filtering a fluid in an aircraft engine, according to the invention.

FIG. 1 illustrates a system 1 for monitoring a filter 3 used for filtering a fluid 5 (oil or fuel) in an aircraft engine 7 according to the invention.

Monitoring the physical condition of the filter 3 is carried out all along its life-time and does not consist in detecting a failure a posteriori, but in preventing these failures in a perspective of optimizing maintenance costs.

The key aspects of the monitoring system 1 consist of identifying the clogging level of the filter 3, of anticipating the wear of the filter 3 during normal or abnormal use in order to predict the remaining life-time before reaching the pre-clogging threshold of the filter. The goals of the monitoring of the main oil and fuel circuit filters are monitoring the clogging of the filter with the purpose of ensuring that it operates properly, for example for the next 20 flights. Moreover, detecting an operating abnormality of the oil/fuel systems or of the filter or detecting abnormal pollution, is also present. This forms a useful piece of information for consolidating a diagnosis on another engine area and for defining the maintenance operations in the case of abnormal pollution.

According to the invention, the monitoring system 1 includes the filter 3, measurement means 9, computing means 11 and storage means 13. The computing 11 and storage 13 means may be part of an electronic unit 15 for processing information such as a computer, used for executing a computer program designed for applying the monitoring of the filter 3 according to the invention. The electronic information processing unit 15 comprises hardware means which are usually found in a computer for example. More particularly, this electronic unit comprises a central processing unit (for example corresponding to the computer means 11) which executes the sequences of instructions of the monitoring program according to the invention, a central memory 17 which stores the data and the programs being executed, digital data media (for example storage means 13) for storing the data, input peripherals for introducing for example, measurements from measurement means 9 or other input data, as well as output peripherals or alerting means 19 (for example, alarms, signaling devices, screens, . . . ) in order to perceive the result of the monitoring of the filter 3.

It will be noted that the electronic processing unit 15 is not necessarily installed in proximity to the filter 3. For example, it may be part of the computer dedicated to the engine 7 of the aircraft, or may optionally be integrated into the casing dedicated to maintenance of the engine 7.

The filter 3 is installed in a circuit 21 of a fluid 5 (for example, oil or fuel) feeding the aircraft engine 7 and has the function of removing particulate pollution present in the circuit 21. The filtering element of the filter 3 captures the particles present in this fluid 5 by means of porous material. Thus, clogging of the filter 3 occurs when the differential pressure for which the filter 3 and the circuit 21 have been designed, has been reached.

The circuit 21 of the fluid 5 is illustrated in a very schematic and very simplified way, limited to a reservoir 23 of the fluid 5, a supply pump 25 and the filter 3.

The measurement means 9 include pressure measurement means 27 for measuring over time a differential pressure $\Delta P$ of the fluid 5 through the filter 3. The pressure measurement means 27 may correspond to a differential pressure sensor of the gauge bridge type installed between the inlet and the outlet of the filter 3 and which allows measurement at any instant of the differential pressure through this filter 3. Alternatively, the pressure measurement means 27 may comprise a first pressure sensor measuring at any instant the pressure of the fluid 5 at the inlet of the filter 3 (i.e., upstream relatively to the direction of the fluid) and a second pressure sensor measuring at any instant the pressure of the fluid 5 at the outlet of the filter 3 (i.e., downstream relatively to the direction of the fluid). In this case, the differential pressure is determined by the computing means 11 by computing the difference between the pressures measured at each instant by the first and second pressure sensors.

Monitoring essentially consists in analyzing the time-dependent change in the differential pressure between the inlet and the outlet of the filter 3, representative of the clogging level of the filter 3. By analyzing the pressure loss versus time it is then possible to predict clogging of the filter 3.

The measurement means 9 may also include means for measuring other characteristics of the fluid. In particular, means 29 for measuring over time a temperature T of the fluid 5 through the filter 3. These temperature measurement means 29 may be installed in proximity to the filter 3 or in any location of the circuit 21 or of the engine 7. In the latter cases, the temperature T through the filter 3 may be estimated by the computing means 11.

The temperature may be used for inferring the viscosity of the fluid 5. Indeed, the computing means 11 may compute a current value of the viscosity of the fluid 5 according to its temperature and according to the characteristics and nature of the fluid 5 (oil, fuel, . . . etc.), with formulae or tables known in the state of the art.

Further, the measurement means 9 may include means 31 for measuring at any instant the flow rate Q of the fluid 5 though the filter 3. Alternatively, the computing means 11 may compute at any instant the current flow rate value of the fluid depending on the engine speed.

The pressure difference, measured directly, gives information on the clogging condition of the filter 3. It nevertheless depends on state parameters of the fluid 5 in particular, the viscosity (depending on temperature) and on conditions of use of the fluid 5 during the measurement, in particular the flow rate. Thus, the viscosity and flow rate give information on the conditions for exploiting the fluid 5.

From the differential pressure ΔP of the filter 3 measured at an instant t and the different associated measurements or data (temperature T and flow rate Q, and optionally the operating duration of the filter), the differential pressure measurement may be readjusted under the reference conditions.

Indeed, the computing means 11 are configured in order to compute a normalized or reference differential pressure ΔPref by normalizing the measured differential pressure ΔP through the filter 3 depending on the exploitation conditions of the fluid 5.

The differential pressure ΔP may then be normalized under reference flow rate and temperature conditions, in order to compute a normalized differential pressure under reference conditions via the following formula:

$$\Delta P_{ref} = \Delta P \frac{\mu_{ref}}{\mu(T)} \frac{Q_{ref}}{Q}$$

With:
ΔPref: normalized current differential pressure,
ΔP: measured differential pressure,
μref: viscosity taken under reference conditions,
μ: computed viscosity at the measured temperature,
T: measured temperature,
Qref: reference flow rate, and
Q: flow rate computed from the engine speed.

The normalized differential pressure under reference conditions, ΔPref, computed from the measured differential pressure ΔP at an instant t may then be used for estimating the pollutant mass M(t) contained in the filter 3 at this instant t.

For this, a reference clogging model is used, ΔP=f(mass), characteristic of the type of filter 3 used and obtained for example from bench tests.

Thus, storage means 13 may be used for storing a predetermined reference clogging curve describing a time-dependent change in the reference normalized differential pressure ΔPref versus a pollutant mass M(t) injected into the filter 3.

Figure 2:
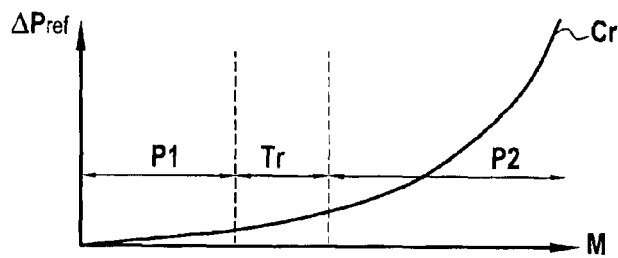
FIG. 2 illustrates an example of a reference clogging curve used in the monitoring system of FIG. 1.

FIG. 2 illustrates an example of such a reference clogging curve Cr which shows that the reference normalized differential pressure ΔPref (in bars) continuously increases depending on the increase in the mass M (in g) injected into the filter 3.

At the beginning, the increase in the normalized differential pressure ΔPref is slow, but becomes substantial, gradually as the mass M injected into the filter 3, the increase becoming more rapid. Indeed, the greater the number of captured particles, less there is space available for the following particles arriving on the filter 3. Thus, this capture causes modification of the porosity of the filtering material which is expressed by an increase in the differential pressure versus time (under constant operating conditions). This kind of curve Cr may be obtained in the laboratory under normalized test conditions with a fluid, with set reference pollution, set flow rate and set temperature.

Moreover, the curve Cr shows that both phases may be distinguished. In a first phase, the particles are for a large majority collected inside the filtering medium (referenced as 3a). During this first filtering phase P1, a so-called <<deep filtering phase>>, the pressure loss of the filter changes very slightly. The transition Tr is reached when the deposit covering the surface of the filtering medium (referenced as 3b) is formed. The second filtering phase P2 corresponds to the increase in the surface deposit which leads to rapid increase in the pressure loss.

Then, from the referenced normalized differential pressure ΔPref, the computing means 11 readjust the condition of the filter under reference conditions in order to be able to use the reference clogging curve Cr.

Optionally, information on the operating duration of the filter, determined by the computing means 11 may also be used for readjusting the condition of the filter under the reference conditions.

Figure 3:
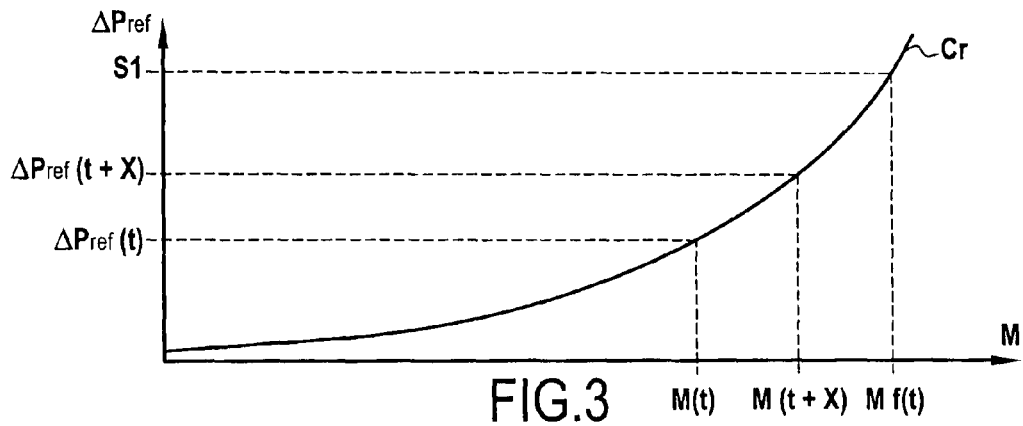
FIG. 3 illustrates determination of a clogging indicator from the reference clogging curve of FIG. 2.

FIG. 3 illustrates the determination at each instant t, of the actual mass M(t) of pollutant contained in the filter 3 and its change (local pollutant concentration C[M]) by projecting the normalized current value ΔPref(t) of the differential pressure stemming from the differential pressure measured at this instant t on the reference clogging curve Cr.

Advantageously, the storage means 13 include a single reference clogging curve Cr for each family of filters 3. In other words, a single clogging curve is applied as a reference to all the filters of a same family for a given aircraft engine 7. This allows savings in computing time and in memory space of the monitoring system.

It will be noted that other indicators, totally independent of the pollutant mass or concentration, may be determined by the computing means 11.

Figure 4:
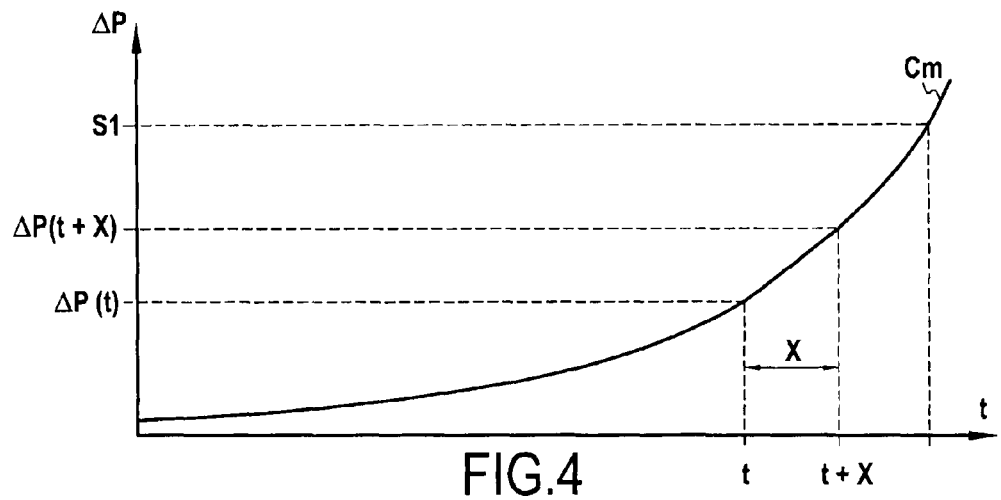
FIG. 4 illustrates determination of another clogging indicator from a clogging curve expressing differential pressure versus time.

In particular, FIG. 4 illustrates the prediction of clogging of the filter by analyzing a local change in a curve Cm expressing the time-dependent change in the differential pressure ΔP measured as a function of time t.

Thus, from the actual pollutant mass M(t) (FIG. 3) or optionally from other indicators (time differential pressure of FIG. 4), the computing means 11 may generate a set of signatures defining the condition and the time-dependent change of clogging of the filter 3, from which a decision may be made (for example, sending an alarm in the case of detection of the end of life of the filter).

It will be noted that in order to refine the generation of the set of clogging signatures, the computing means 11 may localize the operating point on the reference clogging curve Cr periodically.

Advantageously, the set of signatures may include a signature for locally anticipating blocking (for example, a signature of the number of flights), a time signature, a phase signature, an abnormality signature, and optionally other signatures characterizing the condition of the filter.

The signature for locally anticipating clogging indicates a probability of attaining the pre-clogging threshold on a given horizon. This local anticipation signature is generated by the computing means 11 from a trend analysis based on a simplified local model for the time-dependent change in the differential pressure versus time. This signature for locally anticipating clogging (or signature of the number of flights) may indicate a determined number X of flights before reaching the pre-clogging threshold S1 (see FIG. 3).

Indeed, in order to detect the clogging of the filter at a determined number X of flights (for example, X=20 flights), the computing means 11 predict the reference differential pressure $\Delta Pref$ at X flights. For this it is necessary to rely on the abscissa point "equivalent injected mass M(t)" and then to project it X flights further on following the local concentration C[M](t) curve (i.e. the local size of the abscissa jumps of the curve Cr). A prediction of the retained pollutant mass M(t+X) is then obtained in the filter 3 with its associated $\Delta Pref(t+X)$:

$$\Delta Pref(t+X)=F(M(t+X))=F(M(t)+C[M](t) \times X)$$

This signature of the number of flights provides monitoring of the clogging level of the filter 3 with the purpose of ensuring that it operates properly for the next 20 flights for example.

The time signature indicates an evaluation of the remaining operating time of the filter 3 before reaching a predetermined pre-clogging threshold S1 and therefore provides a prediction of the remaining life-time $\Delta t$ of the filter 3 (see FIG. 3). This time signature is generated by the computer means 11 by referring to the reference clogging curve Cr for determining the time period $\Delta t$ between the current point of the operating point corresponding to the current pollutant mass M(t) and a future point or instant associated with a predetermined mass $Mf(t+\Delta t)$ representative of the predetermined pre-clogging threshold S1. Indeed, the computing means 11 estimate from the current point, represented by the current pollutant mass, the mass required for reaching the predetermined pre-clogging threshold S1 and transpose this remaining mass before pre-clogging into an operating time by considering the local pollutant concentration.

The signature of the number of flights and the time signature may also be evaluated without using the reference curve Cr.

In particular, in the case when the actual clogging curve does not follow the theoretical one Cr, the linearity assumption is then used in the time-dependent change of the differential pressure versus time (see FIG. 4). This assumption is verified, in the case of oil and fuel, during the surface clogging phase (i.e., while moving increasingly faster on the clogging curve). A degraded prediction is therefore obtained, in the sense that the latter is only possible in an already critical phase for the filter, and without being concerned with exposure to pollution.

Thus, FIG. 4 shows that during a surface clogging phase, the computing means 11 may detect clogging of the filter 3 at a determined number X of flights (for example, X=20 flights), by predicting the differential pressure $\Delta P(t+X)$ according to a linear extrapolation from the current differential pressure $\Delta P(t)$.

Also, the remaining operating time $\Delta t$ of the filter 3 before reaching a predetermined clogging threshold S1 may be estimated by linear regression of the time-dependent change in the differential pressure (see FIG. 4) from the current differential pressure $\Delta P(t)$.

Moreover, the phase signature is computed by the computing means 11 by referring to the reference clogging curve Cr (see FIG. 2) in order to determine by relying on the thresholds of the actual observed differential pressure, whether the filter 3 is in a depth clogging phase P1 or in a surface clogging phase P2. Indeed, given that depth clogging corresponds to a small time-dependent change of the differential pressure for a large time-dependent change in the injected mass, and that surface clogging corresponds to the fact that a small time-dependent change in mass causes a strong time-dependent change in the differential pressure, this phase signature gives a rapid clue on the condition in which the filter 3 is found.

In particular, as long as it remains in the depth clogging phase P1, the filter 3 does not risk rapid clogging, even at 20 flights. Also, when it is in the surface clogging phase, the filter is "roughly" at the end of its life.

Thus, even if it is not known how to give a reliable prediction at 10 flights, 20 flights, 30 flights . . . it is however possible to simply evaluate the risk of clogging.

Further, the abnormality signature may be computed by the computing means 11 by referring to the reference clogging curve Cr (see FIGS. 2 and 3) in order to determine for example whether there is abnormal pollution. This signature results from the time-dependent trend of the retained mass. By studying the distribution of this information, is possible to estimate the exposure condition of the filter 3 to ambient pollution by a phase for detecting an abnormality as well as by an analysis anticipating the crossing of a threshold. This signature indicates the detection of an operating abnormality of the filter 3 or of the circuit 21 of the fluid 5 in which the filter 3 is installed.

From the signatures generated earlier, a decision is made by the computing means 11 as to the clogging of the filter 3. An alarm is triggered by alerting means 19 when for example the signature of the number of flights indicates pre-clogging, 20 flights in advance.

FIG. 5 schematizes the method for monitoring the filter 3 by referring to the clogging model 41 (for example, the reference clogging curve Cr of FIGS. 2 and 3) established under reference conditions, according to the invention.

Thus, from the data 43 comprising the differential pressure $\Delta P(t)$ of the filter 3 measured at instant t and from different associated measurements (in particular, temperature T(t) and flow rate Q(t)), the condition of the filter is readjusted under the reference conditions.

It is then possible by using the clogging model 41 to compute at each instant t the pollutant mass M(t) contained in the filter 3 and its time-dependent change.

Predicting the differential pressure (having as a threshold that of pre-clogging S1) may then be accomplished via this mass projected into the future, having taken its local concentration into account. Thus, by using the clogging model 41, it is possible to obtain information 45 on the clogging percentage, information 47 on the remaining life-time and information 49 on the risk of abnormal pollution.

FIG. 6 illustrates a generic scheme of an algorithm for monitoring a filter 3 in an oil or fuel circuit 21. This algorithm is developed according to four functional layers or blocks 51-57. The first block 51 corresponds to acquisition of the measurements, the second block 53 relates to the generation of clogging indicators, the third block 55 relates to recognition of signatures, and finally the fourth block 57 corresponds to coming to a decision.

The difference between the algorithm for monitoring the "oil" filter and the one for the "fuel" filter is only located in the configuration of the algorithmic processing (i.e., the reference clogging curve Cr, the reference viscosity, etc.).

The first block 51 attempts to define methods for extracting measurements which will be used for generating the indicators. These measurements essentially relate to the differential pressure $\Delta P$, the temperature T and the flow rate of the fluid Q through the filter at instant t. Indeed, the key indicator used in the monitoring system 1 (see FIG. 1) is the injected pollutant mass M which is obtained from a measurement of differential pressure $\Delta P$, which depends on the operating conditions, i.e. the temperature T and the flow rate Q of the fluid.

It will be noted that these measurements are sufficient, in order to represent the clogging of the filter 3 and thereby allow its monitoring, being aware that it is possible to get rid of the impact of the external conditions or of certain intrinsic parameters of the filter 3. Moreover, the monitoring system 1 uses a semi-empirical approach which has the advantage of being simple, sparing in computational costs, reliable and robust, allowing for significant uncertainties of more than 1% for the information on temperature T and on flow rate Q.

The second block 53 defines the processing with which it is possible by using a clogging model to pass from the measurements acquired previously to the indicators, which will subsequently be processed and tracked in order to carry out monitoring of the investigated system.

Firstly, readjustment of the differential pressure $\Delta P$ measurements is carried out under the reference conditions. Next, the pollutant mass M accumulated in the filter is inferred therefrom. It is then possible to study the time-dependent change in the mass and in particular the local concentration C[M] which is synonymous with exposure to pollution.

The generation of the clogging indicator corresponding to the pollutant mass M present in the filter, is performed by means of the clogging curve Cr used as a reference: $\Delta P_{ref}=f(M)$. The current point is then projected, characterized by differential pressure brought back under reference conditions, on the curve Cr in order to obtain the pollutant mass M contained in the filter 3 at this same instant (see FIG. 3).

By calculating the local concentration of pollutant C[M] (time-dependent change of the mass retained in the filter) it is then possible to know the trend for exposure to pollution. This represents the step with which one moves on the reference curve Cr. It is therefore a good indicator of exposure to pollution (stable, declining, rising exposure, . . . ).

Optionally, the local time-dependent change in the measured differential pressure $\Delta P$ may also be analyzed, with which it is possible to have an indicator totally independent of the selected reference for the case when the latter would not be applied. This independent indicator evaluates the trend in the differential pressure measurement. The successive, vertical jumps on the actual clogging curve are therefore represented here as a function of time and not of the mass (see FIG. 4).

The third block 55 represents the processing, analysis and tracking of the indicators for recognizing signatures S which characterize the clogging condition of the filter 3 or its trend to become clogged. In particular, in order to define the local clogging anticipation signature or the signature of the number of fights relating to the projection at 20 flights of the differential pressure, the signature of the clogging phase of the filter, and the trend of the local pollutant concentration (time-dependent rate of change).

The fourth block 57 has the goal of generating different types of alarms, depending on the signatures formed previously. This block is notably concerned with ensuring proper operation of the filter for the next 20 flights for example. An additional piece of information on excessive pollution may also be appreciated since it may account for an abnormality in the circuit of the fluid or the engine.

From the signatures generated previously, this processing consists of coming to a decision as to the clogging of the filter 3. A first decision may relate to the status of the SF filter which gives an indication on the risk of clogging. A second decision may relate to the prediction PF of clogging of the filter in 20 flights from now (for example, will it have passed the stage of impending by-pass?). A third decision may relate to the abnormality status SA indicating slow or rapid excessive pollution. A fourth decision may relate to the confidence CF which gives an indication on the applicability of the reference clogging to the actually observed clogging.

The status of the SF filter only relies on the observations of the filter 3 without readjustment according to the reference conditions (see FIG. 4). This SF status therefore has all its importance when the confidence coefficient is bad. The decision is then made, when the filter is in a surface clogging phase, to send an alert signal if the projection of the differential pressure (without using the clogging model) indicates that the impending by-pass threshold S1 is exceeded.

The alarm for predicting the end of life corresponds to the indication of pre-clogging for example, 20 flights in advance. It is based on the projection made according to the reference clogging model (see FIG. 3). The decision is made to generate the alarm when the projection of the differential pressure is above the impending by-pass threshold S1.

The abnormality status SA meets the need of detecting excessive pollution, synonymous with poor use of the filter 3 (abnormal conditions) or with degraded conditions of use (system abnormalities). The decision is made according to the trend in the time-dependent change of the local concentration.

Moreover, the confidence indication status CF has the purpose of defining the confidence level of the prediction by using the reference clogging model. This confidence level is comprised between 0 and 1 (0 if one is not at all confident and 1 if one is confident). The decision corresponds to the applicability of the clogging model, readjusted according to the actual conditions of use, to the actually observed clogging curve.

In order to calculate the confidence level, the computing means 11 take the characteristics of the monitoring system 1 into account. That is to say that the reference model is applicable to cloggings of the same filter family and that the conditions of use may be readjusted according to the measurements of temperature T and of flow rate Q through the filter 3. The computing means 11 therefore bring back the reference clogging under the same conditions of use as the one observed. With this, it is possible to find a relative local concentration to the range of studied clogging (a relative step for advancing on the curve, within the limits of the sought pressure differences, between the reference one and the observed one). The computing means 11 may then calculate the average relative gap between both of these thereby readjusted curves under similar conditions.

Moreover, according to a preferred embodiment, the different steps of the monitoring method according to the invention are executed by means of program code instructions.

Accordingly, the invention also aims at a computer program product, this program being capable of being applied in the electronic information processing unit 15, this program including code instructions adapted to applying the monitoring according to the invention as described above.

This program may use any programming language and be in the form of source code, object code or an intermediate code between source code and object code, such as in a partly compiled form or any other desirable form.

The instructions of the computer program as mentioned above may be recorded in an information medium legible by a computer. The information medium may be any entity or device capable of storing the program. For example, the medium may include a storage means such as a ROM, for example a CDROM or a ROM of a microelectronic circuit, or any other recording means.

On the other hand, the information medium may be a transmissible medium such as an electrical optical signal, which may be forwarded via an electrical or optical cable, by radio or by other means.

Alternatively, the information media may be an integrated circuit into which the program is incorporated, the circuit being adapted for executing or for being used in the execution of the relevant monitoring method.

The invention claimed is:

1. A system for monitoring a filter used for filtering a fluid in an aircraft engine, comprising:
   pressure measurement means for acquiring over time a differential pressure of the fluid through the filter;
   temperature measurement means for acquiring over time a temperature of the fluid through the filter;
   computing means for computing a current viscosity value of the fluid depending on its temperature;
   computing means for computing a current flow rate value of the fluid depending on the engine speed;
   computing means for computing a normalized differential pressure, under reference conditions by normalizing the differential pressure measured as a function of the conditions for exploiting the fluid, the fluid exploitation conditions used for normalizing the differential pressure including said current viscosity value and said current flow rate value;
   storage means for storing in memory a predetermined reference clogging curve describing a time-dependent change of the normalized differential pressure depending on a pollutant mass injected into the filter;
   computing means for estimating the pollutant mass injected into the filter by projecting a current value of said normalized differential pressure onto said reference clogging curve; and
   computing means for generating from said estimated pollutant mass a set of signatures defining the condition and the time-dependent change of clogging of the filter.

2. The monitoring system according to claim 1, wherein the set of signatures includes a time signature indicating an evaluation of the remaining operating time of said filter before reaching a predetermined pre-clogging threshold, said time signature being generated by computing means by referring to the reference clogging curve, the computing means being configured in order to estimate from a current point, represented by a current pollutant mass, the mass required for reaching the predetermined pre-clogging threshold, and to transpose this remaining mass before pre-clogging into an operating time by considering the local pollutant concentration.

3. The monitoring system according to claim 1, wherein the set of signatures includes a signature for locally anticipating clogging indicating a probability of reaching the pre-clogging threshold in a given horizon, said local anticipation signature being generated by the computing means from a trend analysis based on a simplified local model for the time-dependent change of the differential pressure versus time.

4. The monitoring system according to claim 3, wherein aid signature for locally anticipating clogging indicates a determined number of flights before reaching the pre-clogging threshold.

5. The monitoring system according to claim 1, wherein the set of signatures includes a phase signature indicating whether the filter is in a depth clogging phase or in a surface clogging phase.

6. The monitoring system according to claim 1, wherein set of signatures includes an abnormality signature informing on the detection of an abnormal operation of the filter or of a circuit in which the filter is installed.

7. The monitoring system according to claim 1, further comprising alerting means for sending an alarm in the case of detection of the end of life of the filter.

8. A method for monitoring a filter used for filtering a fluid in an aircraft engine, comprising the following steps:
   measuring over time a differential pressure of the fluid through the filter, wherein said measuring of the differential pressure is performed with a pressure sensor;
   measuring over time a temperature of the fluid through the filter, wherein said measuring of the temperature is performed with a temperature sensor;
   computing, with an electronic unit, a current viscosity value of the fluid depending its fluid temperature;
   computing, with said electronic unit, a current flow rate value of the fluid depending on engine speed;
   computing, with said electronic unit, a normalized differential pressure under reference conditions by normalizing the measured differential pressure according to the conditions for exploiting the fluid, the fluid exploitation conditions used for normalizing the differential pressure including said current viscosity value and said current flow rate value;
   storing, with said electronic unit, a predetermined reference clogging curve describing a time dependent change of the normalized differential pressure depending on a pollutant mass injected into the filter;
   estimating, with said electronic unit, the pollutant mass injected into the filter by projecting a current value of said normalized differential pressure onto said reference clogging curve; and
   generating, with said electronic unit, from said estimated pollutant mass a set of signatures defining the condition and the time-dependent change of clogging of the filter.

9. A non-transitory computer readable storage medium encoded with computer executable instructions, which when executed by a computer, cause the computer to perform the monitoring method according to claim 8.

* * * * *